United States Patent [19]

Walls

[11] 4,401,860

[45] Aug. 30, 1983

[54] FREQUENCY SIGNALING METHOD AND APPARATUS WITH DYNAMIC COMPENSATION FOR FREQUENCY ERRORS

[75] Inventor: Jim E. Walls, Bexley, Ohio

[73] Assignee: Bell Telephone Laboratories, Incorporated, Murray Hill, N.J.

[21] Appl. No.: 344,225

[22] Filed: Jan. 29, 1982

[51] Int. Cl.³ .............................................. H04M 3/24
[52] U.S. Cl. ............................ 179/175.2 C; 179/6.17; 455/67; 455/71
[58] Field of Search ............... 179/175.2 C, 6.17, 16, 179/175.3 R; 371/25; 364/571; 455/63, 67, 71

[56] References Cited

U.S. PATENT DOCUMENTS

| | | | |
|---|---|---|---|
| 3,040,298 | 6/1962 | Thomas, Jr. et al. | 340/171 R |
| 3,766,472 | 10/1973 | Whitney | 324/78 |
| 3,920,913 | 11/1975 | Keeney | 179/8 A |
| 4,161,722 | 7/1979 | Tatch | 340/171 |
| 4,199,668 | 4/1980 | Scozzari | 179/175.3 R |

Primary Examiner—Stafford D. Schreyer
Attorney, Agent, or Firm—J. W. Herndon

[57] ABSTRACT

Frequency encoded signaling method and structure to correct for frequency error introduced in the generation of encoded signals. A sequence of frequency encoded signals are recorded on rotating magnetic recording devices in telephone offices in conjunction with recorded announcements. The signals identify the types of announcements. Speed variations in the different recording devices introduce frequency errors in the reproduction of the signals, hindering their automatic decoding. This problem is solved by recording a reference frequency signal with the encoded signals on the recording devices. A receiver detects the signals and measures the difference between the expected reference signal frequency and the received reference signal frequency. The measured frequencies of the encoded signals are then adjusted in accordance with the difference before final examination and classification of the signal sequence is perfor 29 Claims, 16 Drawing Figures FIG. 1
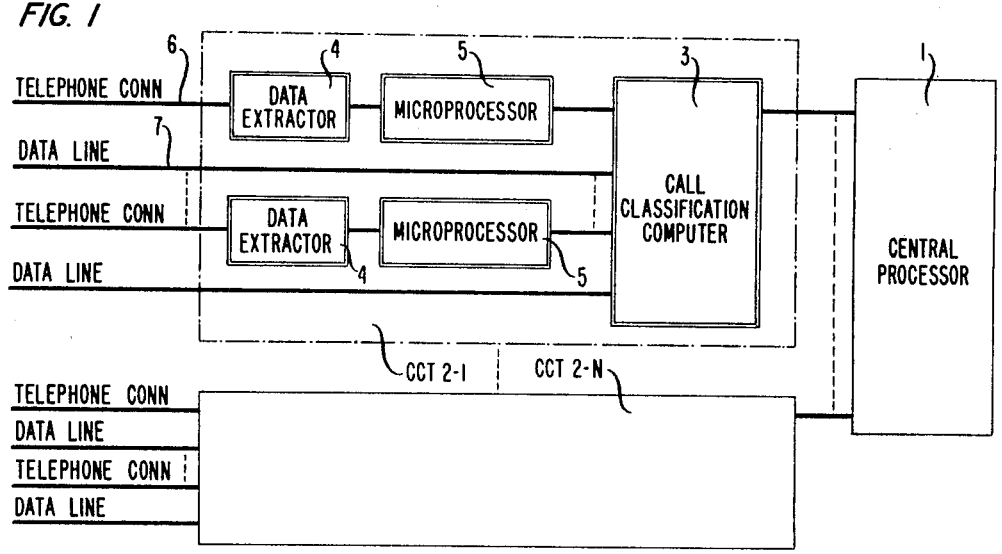
FIG. 2
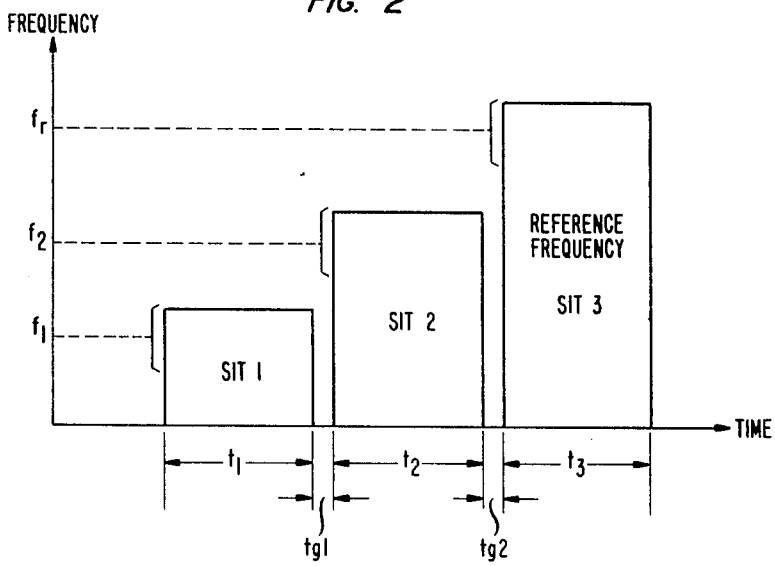
FIG. 3
| ANNOUN TYPE | $f_1$ (Hz) | $f_2$ (Hz) | $f_r$ (Hz) | $t_1$ (ms) | $t_2$ (ms) | $t_r$ (ms) |
|---|---|---|---|---|---|---|
| IC | 900–950 | 1350–1400 | 1750 TO 1850 | 160–320 | 160–320 | 160 TO 520 |
| VC | 951–1000 | 1350–1400 | | 321–520 | 160–320 | |
| NC | 951–1000 | 1401–1450 | | 321–520 | 321–520 | |
| RO | 900–950 | 1401–1450 | | 160–320 | 321–520 | |

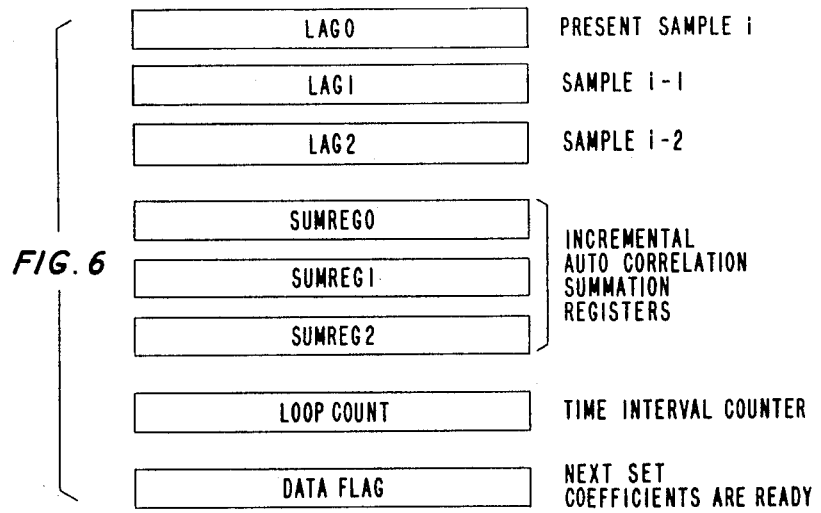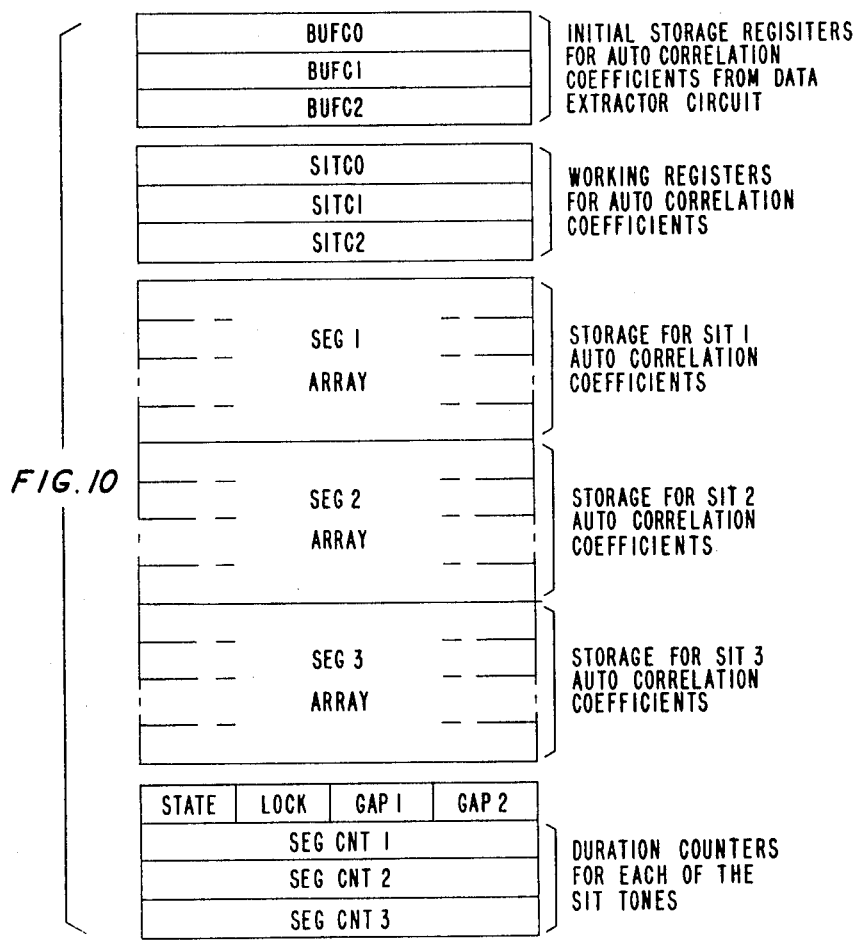

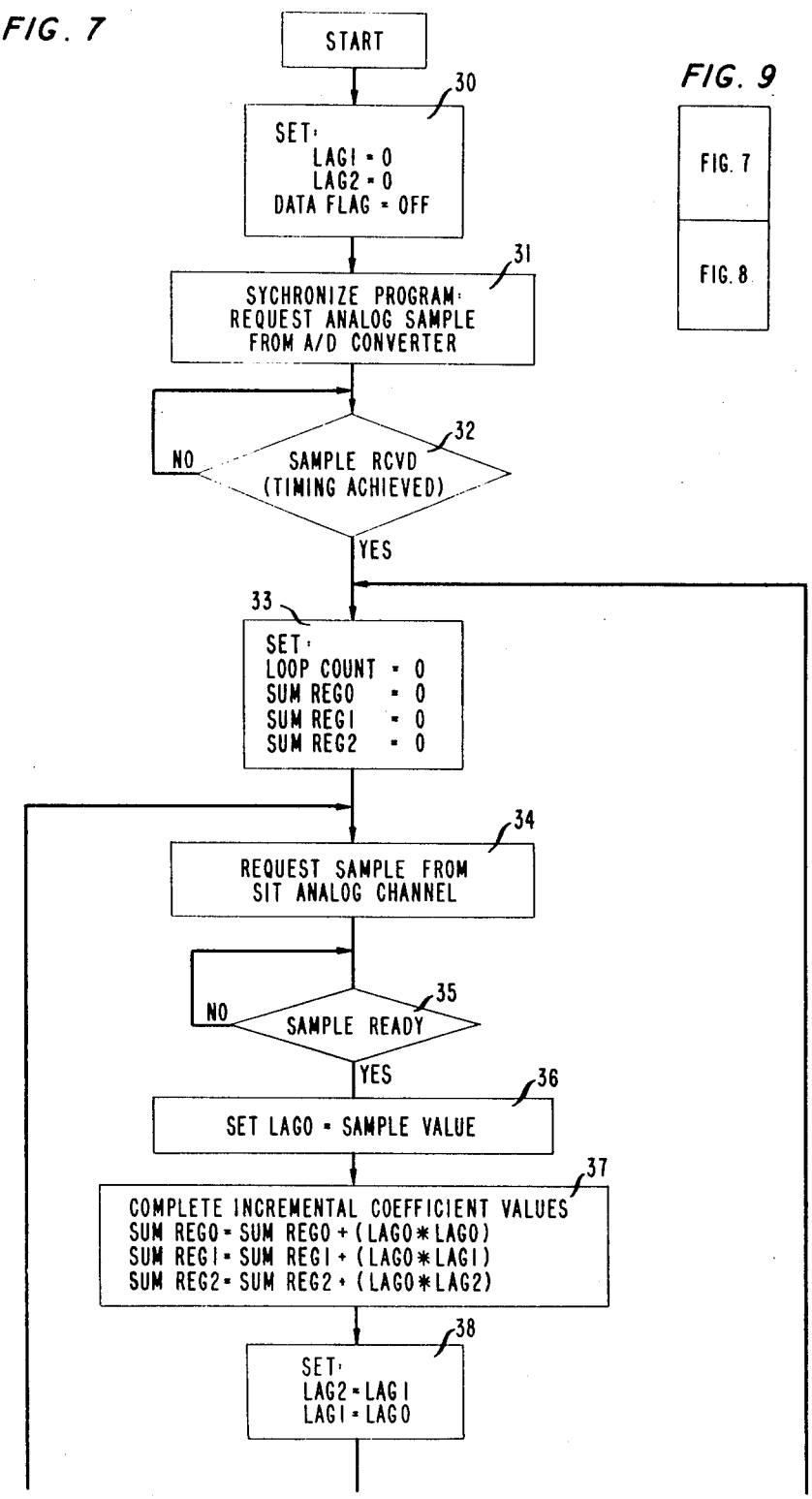
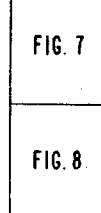
FIG. 7
FIG. 9

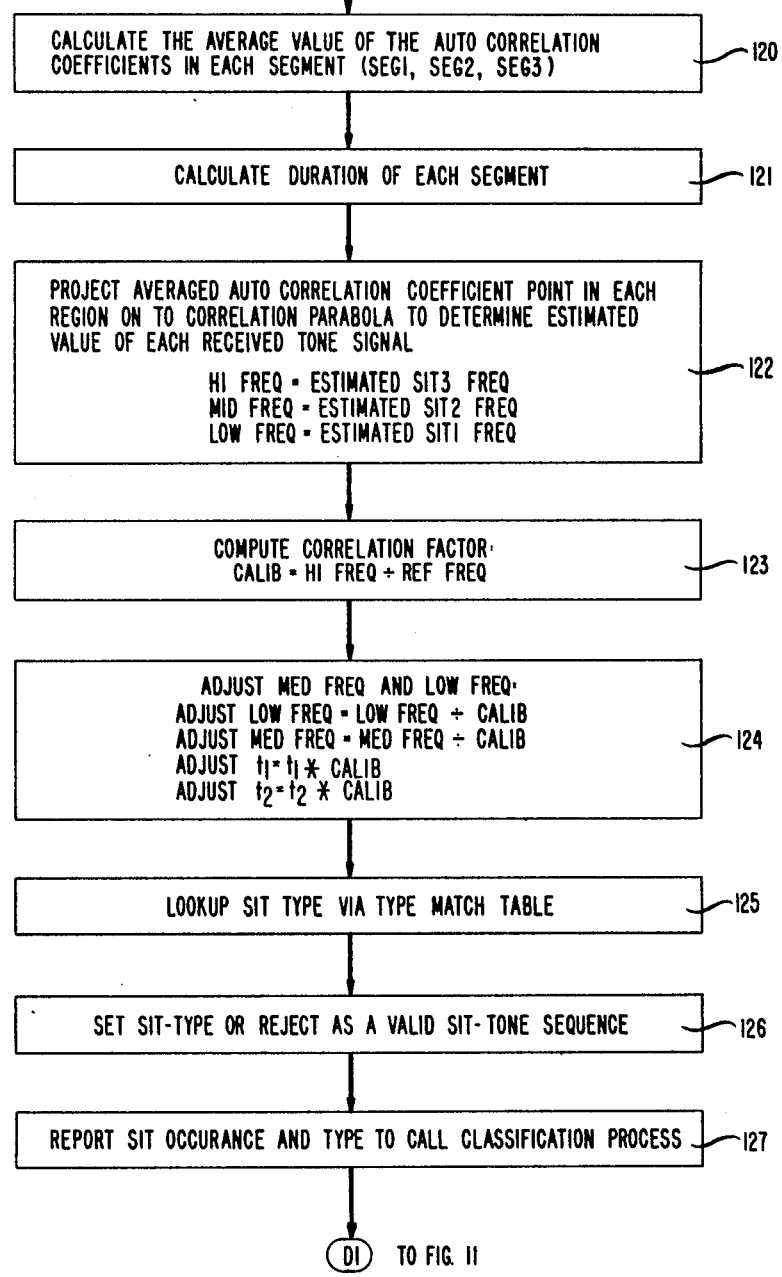

FREQUENCY SIGNALING METHOD AND APPARATUS WITH DYNAMIC COMPENSATION FOR FREQUENCY ERRORS

TECHNICAL FIELD

The invention relates generally to frequency encoded signaling, and particularly to a method and apparatus for dynamically compensating for frequency errors introduced in the generation of frequency encoded signals.

BACKGROUND OF THE INVENTION

The telephone industry has always attempted to maintain high standards in its provisions of services to the public. Part of this effort in the past has involved service observation of non-conversational portions of arbitrarily selected telephone calls. The observed and evaluated operations include operator responses and procedures, equipment delays, disposition of calls, etc. At one time service observing was predominantly manual requiring the use of many personnel. In one effort to reduce the manual effort required for this purpose, and also to minimize as much as possible the extent of access of a service observing operator to a call, the Bell System some time ago introduced the Service Evaluation System (SES) No. 1. This system automated many of the operations previously performed by service observing personnel. At the present time, efforts to further automate these operations are being made. In particular, one aspect of such efforts is in the automatic detection of calls completing to announcement machines and the identification of the types of announcements encountered by such calls. Such announcements pertain, for example, to changed number, interrupt, vacant code, call blocked announcements, and the like.

To provide the capability for a machine to differentiate between the speech of a recorded announcement and that of a normally answered call, special information tones, called SIT tones, are magnetically recorded on analog recording drums in telephone offices in conjunction with the announcements. SIT tones used by the Bell System consists of a sequence of tone bursts (pulses) in which each pulse is encoded in both frequency and duration. The tones are broadcast immediately before the announcement with which they are associated. The presence of the SIT tones differentiates a recorded announcement from a called party answer. The frequency and duration encoding of the SIT tones uniquely identify the particular type of announcement in question.

The actual frequencies of the SIT tones that are generated and transmitted when a recorded announcement is made by a rotating device in a particular telephone office is dependent on the rotational speed of the device. Measurements that have been taken of mechanical drum recorders in use by telephone companies show that drum rotation speeds of such recorders vary from specification by as much as ±5 percent. This speed variation is perfectly satisfactory to reproduce high quality, intelligible speech signals. It is inadequate, however, to reproduce encoded tone signals that must be selectively and reliably decoded. For example, a nominal 1800 hertz per second tone on such a device might actually be reproduced as a signal anywhere in the range of 1710 to 1890 hertz per second. The problem of automatically classifying such a signal is worsened by the fact that the practical choice of encoding frequencies is limited in the intended telephone network environment in that they must not conflict with other conventional tone signals used for signaling in the telephone network.

SUMMARY OF THE INVENTION

The above problems are solved in a method and apparatus of signaling by transmitting to a receiver one or more frequency encoded information signals in conjunction with a reference frequency signal. The receiver measures the frequency of each of the tone signals and calculates a correction factor based upon the difference between the measured frequency of the reference signal and the defined value of the reference signal frequency. It then adjusts the measured frequencies of the information signals in accordance with the correction factor. The adjusted information signals are then used to determine whether or not a special information tone sequence has arrived.

The method and apparatus are illustratively used in a telephone service evaluation system (SES) which automatically detects and classifies recorded announcements. Special information tones are recorded on a rotating magnetic announcement machine in conjunction with each recorded announcement. The frequency and time duration of the signals are encoded at specification speed of the announcement machine to classify the type of announcement. One of the tone signals is a reference tone signal having a defined reference frequency at the specification speed. The SES monitors telephone connections for a sequence of tones whose frequency and duration appear to represent a sequence of SIT tones within determined error margins based upon the amount of deviation from specification speed that announcement machines in the field actually experience. When a sequence is encountered which appears to be a SIT tone sequence, the SES calculates a correction factor in conformance with the error between the defined value of the reference frequency and the measured frequency of the suspected reference signal of the potential SIT tone sequence. The system then corrects the measured frequencies and time durations of the remaining signals of the tone sequence in conformance with the correction factor. The corrected signals are used to determine if the sequence is in fact a SIT tone sequence and to classify the type of the recorded announcement.

BRIEF DESCRIPTION OF THE DRAWING

In the drawing:

FIG. 1 is a block diagram of a service evaluation system including a plurality of call classification terminals (CCTs) each including a plurality of data extractors for sampling analog signals, a plurality of microprocessors for computing autocorrelation coefficients from the samples and a call classification computer for determining the frequency and duration of sampled signals; each data extractor with an associated microprocessor and in conjunction with the call classification computer form one SIT tone receiver;

FIG. 2 shows an illustrative sequence of special information tone (SIT) signal bursts used to classify recorded announcements;

FIG. 3 is a table defining frequency bands and time durations for several types of recorded announcements for the information tone signals of FIG. 2;

FIG. 6 shows a number of storage words which are used by the microprocessor program; and FIGS. 7 and 8 arranged according to FIG. 9 is a flowchart of a program which controls the execution of the microprocessor of the receiver;

FIG. 10 shows a number of storage words used by the call classification computer program; and FIGS. 11 through 15 arranged according to FIG. 16 is a flowchart of a program which controls the call classification computer of FIG. 1.

DETAILED DESCRIPTION

Figure 4:
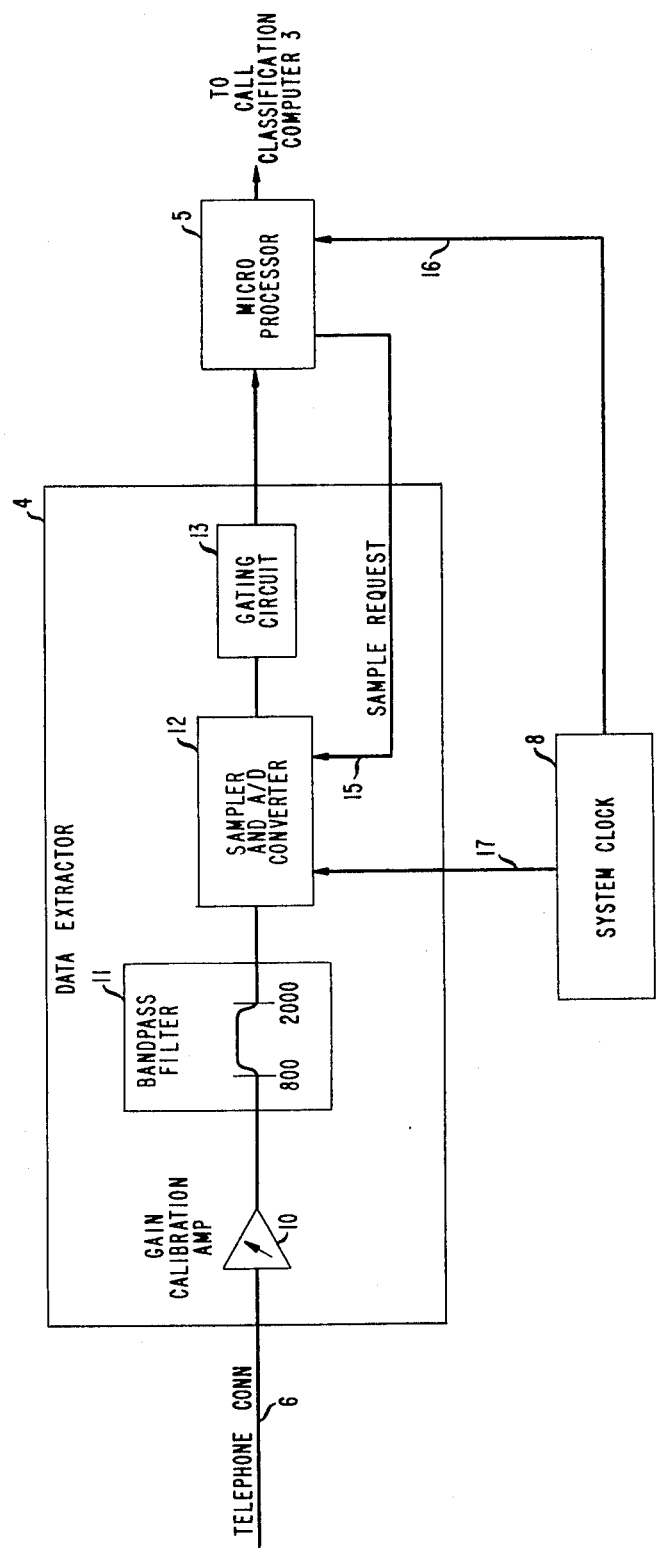
FIG. 4 is a more definitive block diagram of the data extractor shown in FIG. 1.

The service evaluation system (SES) of FIG. 1 comprises a central processor 1 and a plurality of call classification terminals (CCTs) 2-1 to 2-N. Each call classification terminal, such as CCT 2-1, comprises a call classification computer 3 which has inputs from a plurality of microprocessors 5. Each of the microprocessors accepts samples of analog signals from a different data extractor 4. A single data extractor 4 and its associated microprocessor 5 monitor a single analog telephone connection such as 6 in FIG. 1. Associated with each telephone connection is also a data connection 7 which feeds directly to call classification computer 3. The information on a data connection 7 includes signaling information such as dual-frequency dialing signals that pertain to the telephone call on its associated connection 6. A data extractor 4 and its associated microprocessor 5 operate, as will be seen, to sample analog information on its associated telephone connection 6, to convert the sampled information into autocorrelation coefficients and to communicate this information to call classification computer 3. Computer 3 analyzes the coefficients from each of the telephone connections with which it is associated to determine when SIT tone sequences have arrived and to classify the types of announcements indicated by the sequences. Each of the call classification computers 3 in the call classification terminals 2-1 to 2-N communicate their determinations to a central processor 1 which consolidates the results.

FIG. 2 shows a sequence of SIT tones which are used in the illustrative embodiments. By way of example, the sequence comprises three tones, SIT1, SIT2 and SIT3. The tones may have prescribed maximum time gaps $t_{g1}$ and $t_{g2}$ separating them. SIT tones 1 and 2 are information tones and have defined frequencies $f_1$ and $f_2$ that are within the frequency bands defined in the table of FIG. 3. These tones also have time durations $t_1$ and $t_2$ which are also defined in FIG. 3. SIT tone 3 is a reference frequency tone having a defined reference frequency of 1777 hz and a band of acceptance which varies from 1750 to 1850 hz. The acceptable time duration $t_r$ of a probable SIT tone 3 is illustratively 160 to 520 milliseconds. The illustrative types of announcements classified by this system are shown in FIG. 3 and are interrupt (IC), vacant code (VC), call blocked (NC) and reorder (RO). As shown in this figure, if an illustrative consecutive sequence of 3 tones are detected having the corrected frequencies 925 hz, 1375 hz and 1777 hz, respectively, and assuming that the time durations of the tones as well as the gaps between the tones are proper, the call classification computer 3 will interpret this as the generation of an intercept (IC) recorded announcement. This classification is performed after the correction of SIT tones 1 and 2. Initially, the tone receiver to be described looks for a probable SIT tone sequence in which the individual frequencies and durations of SIT tones 1 and 2 are broader than those shown in FIG. 3 and the probable reference tone frequency is within the 1750 to 1850 hz band shown in FIG. 3. When such a probable sequence is detected, a correction factor is determined based upon the difference between the defined reference frequency of 1777 hz and the measured frequency of the probable reference tone SIT 3. The measured frequencies and durations of SIT tones 1 and 2 are then corrected according to the correction factor. The acceptance or rejection of the sequence as a SIT tone sequence, and the classification as to announcement type, is performed using the corrected SIT tones 1 and 2.

With reference now to FIG. 4 a data extractor of FIG. 1 operates to repetitively sample signals on a telephone connection such as 6 and to convert the samples to digital values for use by microprocessor 5. Data extractor 4 comprises a gain calibration amplifier 10 which adjusts the gain of signals on the telephone connection to compensate for losses on the telephone network and to provide a standardized level to the succeeding circuits of data extractor 4. The output of amplifier 10 is passed through a bandpass filter 11 which suppresses frequencies outside the range of 800 to 2000 hz. With reference to FIG. 3, it is seen that the frequency band passed by the filter 11 includes all valid SIT tones. The signal from filter 11 is inputted to a conventional and illustrative analog sampler and analog to digital converter 12. In the preferred embodiment, circuit 12 converts the analog samples to 13-bit digital samples. These samples are gated by gating circuit 13 to microprocessor 5 upon requests by the microprocessor by a signal appearing on lead 15. A system clock 8 generates two clock streams. An 8 megahertz (mhz) clock stream appears on lead 16 to drive microprocessor 5. A 4 kilohertz (khz) clock stream appears on lead 17 to drive the sampler and analog to digital converter 12 so that it generates digitized samples at a 4 khz rate.

Microprocessor 5 is illustratively an 8086 16-bit single-chip integrated circuit manufactured by Intel Corp. It operates on the samples from circuit 12 to compute repetitively the first three autocorrelation coefficients of signals on a telephone connection 6 and to transmit each set of calculated coefficients to call classification computer 3.

Figure 5:
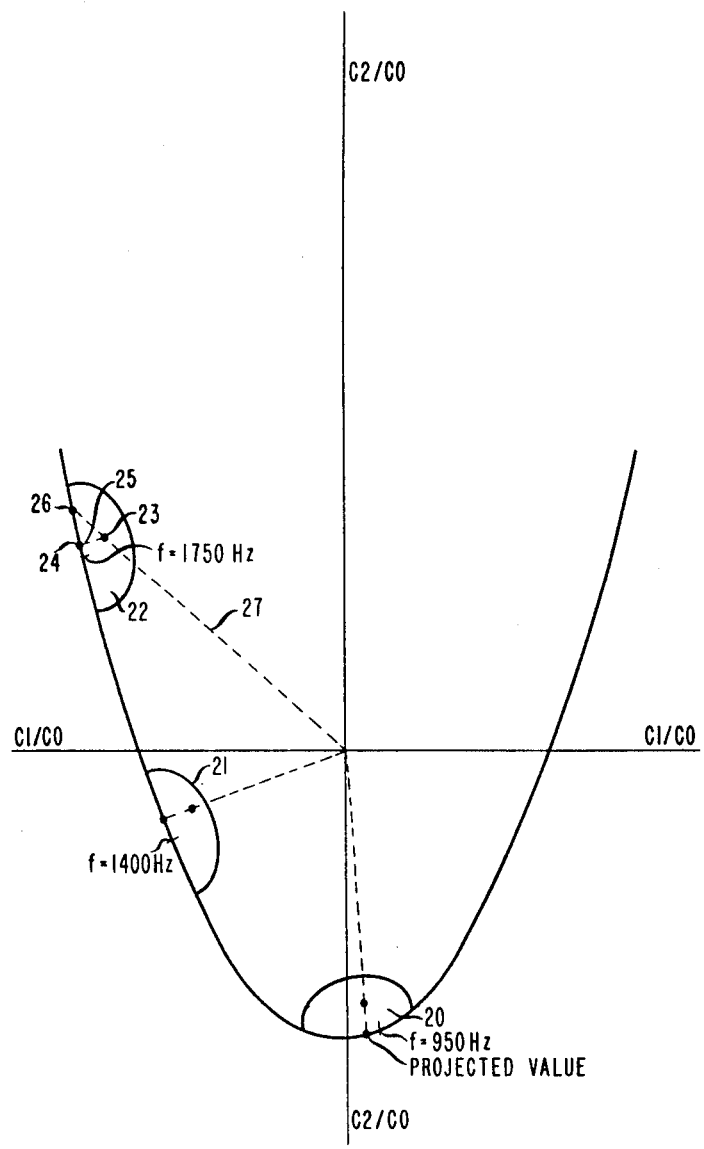
FIG. 5 shows a parabolic curve defined by the first three autocorrelation coefficients C0, C1 and C2 of any signal and in which prescribed internal regions bounded in part by the curve include the frequency bands of the SIT tone signals; these regions are used by the SIT tone receiver to detect a probable SIT tone sequence and to correct the frequencies thereof in order to accurately determine if the probable SIT tone sequence is, in fact, a valid SIT tone sequence.

Call classification computer 3 analyzes successive sets of autocorrelation coefficients to determine if a SIT tone sequence has occurred. If s(t) is an analog signal in the time domain, then the nth autocorrelation coefficient over an interval of time T is defined by the integral $C_n = 1/T \int s(t)s(t+nt)dt$ where n=0,1,2 etc. In the embodiment to be described, first three coefficients C0, C1 and C2 are computed. For a sinusoidal tone, it can be shown that $C2/C0 = 2(C1/C0)^2 - 1$. This is the equation for the parabola shown in FIG. 5 in which the abscissa corresponds to C1/C0 and the ordinate corresponds to C2/C0. All sinusoidal tones are represented by a point lying on the parabolic curve. As distortion is added to a sinusoidal signal, the corresponding point defined by the coefficients C0 to C2 moves off the curve toward the inside of the parabola. To detect tone sequences that initially appear to be valid SIT tone sequences, regions 20, 21 and 22 are defined in FIG. 5 which encompass the frequency bands shown in FIG. 3 of valid SIT tones. Specifically, regions 20 and 21 correspond to SIT tones 1 and 2, respectively, and each region encompasses a frequency range broader than the defined SIT tone frequency range with which it is associated by an appropriate amount of error margin. Region 22 corresponds to SIT tone 3 and encompasses the frequency range of 1750 to 1850 hz. These regions extend into the internal area of the parabola to compensate for any deviation from a pure sinusoidal tone which might reasonably be expected to occur in actual practice.

Assume that a sequence of signals has been detected, as will be described, that are within the regions 20, 21 and 22. Assume that the probable reference tone signal has autocorrelation coefficients that place it at point 23 within region 22. To calculate a correction factor for adjusting the frequencies of the signals corresponding to the regions 20 and 21, the fundamental frequency associated with the probable reference signal must be determined. The fundamental frequency can be estimated by extrapolating point 23 to the nearest point lying on the parabolic curve. At least two methods of locating the nearest point on the curve can be used. In a mathematical sense, the closest point would be point 24 which is determined by a line 25 normal to the curve and passing through point 23. If the nature of distortion of a pure sinusoid is assumed to be uncorrelated noise, the best estimate for the fundamental frequency is point 26 which lies on the curve along a line 27 passing through the intersection of the axes of FIG. 5. Both of these methods have been used with no significant difference between the results. The preferred embodiment uses the technique that results in point 24 being selected. In either event, the difference between the measured value of the reference frequency, such as point 24, and the defined value of the reference frequency is used to adjust the measured frequencies of the signals in regions 20 and 21 before classification is attempted.

FIG. 6 shows memory storage words that are used by the program of microprocessor 5 in the computation of the autocorrelation coefficients. LAG0, LAG1 and LAG2 are used to store digitized samples of signals from a telephone connection 6. Specifically, LAG0 stores a present sample i, LAG1 stores the immediately preceding sample i-1 and LAG2 stores sample i-2. SUMREG0, SUMREG2 and SUMREG3 are used to accumulate incremental values of the autocorrelation coefficients C0, C1 and C2 from the samples as they arrive from data extractor 4. LOOPCOUNT stores the number of samples that have been taken pertaining to any given set of coefficients which are being calculated. As will be seen this allows microprocessor 5 to measure the time duration of signals. DATAFLAG stores an indication that a set of coefficients have been calculated to cause the coefficients to be transmitted to call classification computer 3.

Figure 8:
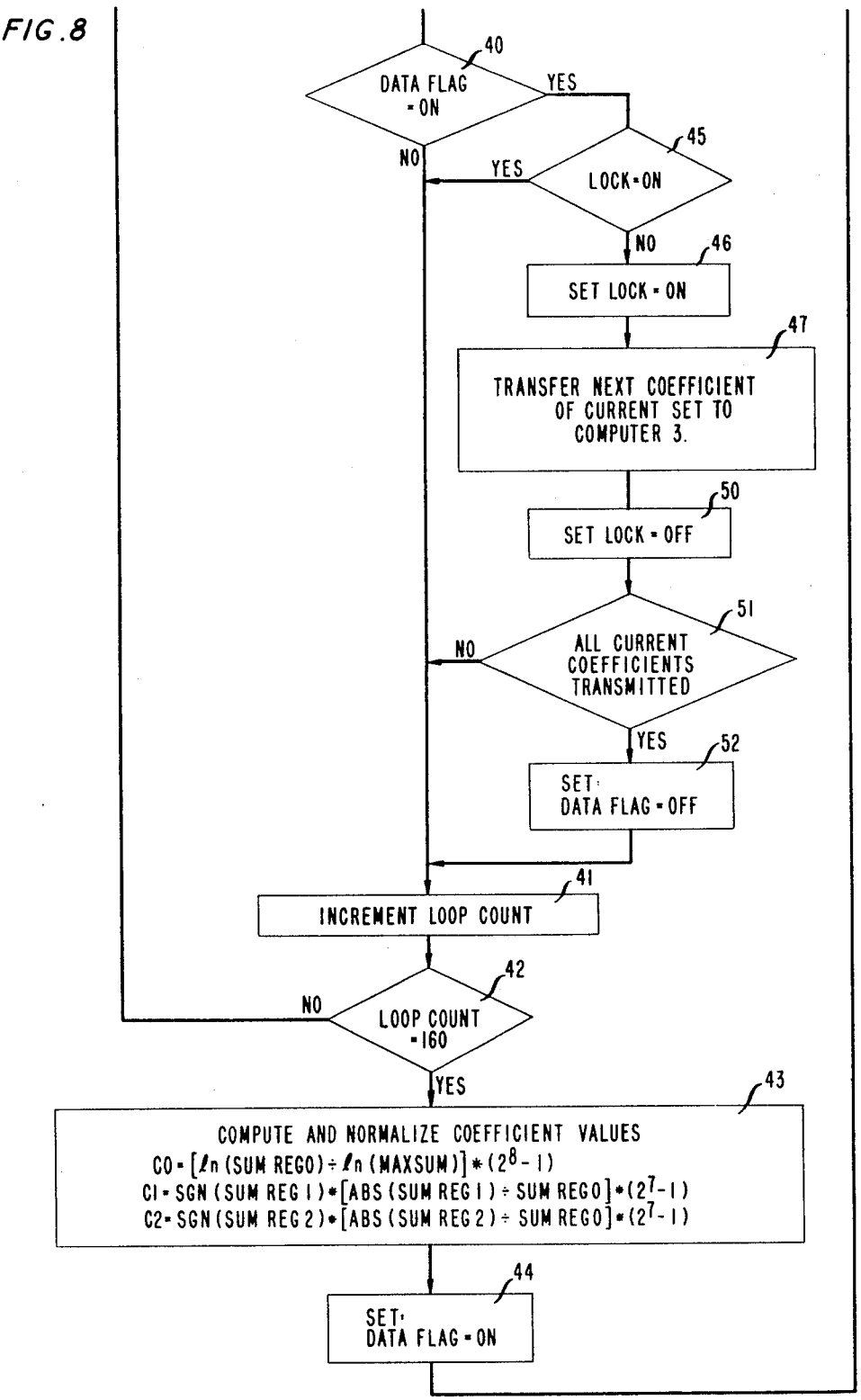

With reference now to FIGS. 7 through 9, I will describe the operation of microprocessor 5. Assume that microprocessor 5 is initially activated. Program execution begins at START. At step 30, the program first clears LAG1 and LAG2 and sets DATAFLAG to state OFF to indicate that no autocorrelation coefficients have yet been calculated. At step 31, the program synchronizes itself with the sampling times of A to D converter 12. It does this by requesting a sample by a signal on lead 15 to the converter. The sample is ignored when it is received at step 32 and the program proceeds in its normal operating mode. Because the program time for processing each sample, by design, is always less than the time between samples, this procedure is sufficient to accomplish the synchronization.

At step 33 the program clears LOOPCOUNT and SUMREGS0, 1 and 2 to prepare to compute the first (next) set of autocorrelation coefficients. A sample from converter 12 is requested at step 34. The program then proceeds to loop at step 35 until the sample arrives via gating circuit 13. At that time LAG0 is set equal to the digitized sample value at step 36. At step 37, the program begins to compute the incremental values of autocorrelation coefficients C0, C1 and C2 in accordance with a summation approximation of the $C_n$ integral described earlier. Specifically, SUMREG0 is set equal to its present contents, which happens to be 0 for the first sample, plus the square of the contents of LAG0. SUMREG1 is set equal to its current contents plus the value of LAG0 times LAG1. SUMREG2 is set to its current value plus the value of LAG0 times LAG2. This process will be repeated for a total of 160 samples to form one set of autocorrelation coefficients. This number of samples is arbitrarily large enough to give satisfactory results.

Next at step 38, the program updates LAG1 and LAG2 according to the respective values of LAG0 and LAG1 to maintain a continuous history of the three most recent samples. At this point the program is finished processing the current sample and next determines whether or not a set of coefficients have been computed for transmission to computer 3. It does this by interrogating DATAFLAG for the state ON at step 40. In the current instance, DATAFLAG is set to the OFF state since we have processed only one sample. The program therefore increments LOOPCOUNT at step 41 and determines at step 42 whether or not 160 samples have been processed. If not, program execution is resumed at step 34 to request the next sample.

The program loop just described beginning at step 34 and ending at step 42 is repeated until 160 samples have been processed at which time the coefficients are computed at step 43 from the data stored in SUMREG0 through SUMREG2. These storage locations are each 32 bits wide, whereas the transmission link between microprocessor 5 and computer 3 is only 8 bits wide, in the illustrative embodiment. The coefficients are normalized to fit within the 8-bit transmission field. The C0 coefficient is computed and normalized by dividing the natural logarithm of SUMREG0 by the logarithm of the largest value that can be contained in SUMREG0, identified in the figure as MAXSUM. This results in a number no larger than the value 1. This number is multiplied by $2^8-1$ to result in a number that will fit in an 8-bit wide field. One bit of each of SUMREG1 and SUMREG2 maintains the numerical sign of the remaining information of the storage location. C1 is computed and normalized by multiplying the sign of the SUMREG1 contents by the result of the absolute value of SUMREG1 divided by the value of SUMREG0, and multiplying this calculation by $2^7-1$. C2 is computed and normalized in a similar fashion as C1.

After the coefficients are computed and normalized, DATAFLAG is set to state ON at step 44 to cause the coefficients to be transmitted to computer 3 after processing of the next sample. Program execution then returns to step 33 to begin computation of the next set of coefficients. After the next sample is processed, DATAFLAG is interrogated at step 40. Since it is in state ON, the program attempts to transmit the set of coefficients just calculated to computer 3. A flag called LOCK is interrogated at step 45 to determine if the coefficients can be transmitted at this time. LOCK is a flag maintained by computer 3 to provide a hand shaking mechanism between microprocessor 5 and computer 3 for the non-interfering transmittal of the coefficients. This will be described in more detail in my discussion of the operation of computer 3. In the meantime, assuming LOCK is in the OFF state, microprocessor 5 sets it to the ON state in step 46 and transmits the coefficients to computer 3 at step 47. This is accomplished by loading the coefficients into a conventional UART (universal receiver/transmitter-not shown) which thereafter autonomously transmits the coefficients without further control by microprocessor 5. The program executes states 45 through 51 after obtaining each sample until all three coefficients have been loaded into the UART. It then sets DATAFLAG to state OFF at step 52 so that the transmission of coefficients will not be attempted again until the next set has been computed by the priorly described program.

FIG. 10 shows storage words used by the program of computer 3 in its processing of coefficients from microprocessor 5. BUFC0, BUFC1 and BUFC2 are storage words which are loaded with the respective coefficients C0, C1 and C2 as they arrive from microprocessor 5. SITC0, SITC1 and SITC2 are loaded with the coefficients from BUFC0 through BUFC2 to free the latter while processing is proceeding. SEG1, SEG2 and SEG3 are memory arrays for storing successive sets of the coefficients as they arrive that appear to represent possible SIT tones. SEG1 stores all the coefficients pertaining to a probable SIT tone 1, SEG2 stores all coefficients pertaining to a probable SIT tone 2 and SEG3 stores all coefficients pertaining to a probable SIT tone 3. In the illustrative embodiment, a maximum of 16 sets of the coefficients are collected for each SIT tone. Accordingly, each of the arrays has $16 \times 3$ coefficients = 48 storage locations. A flag STATE is used to store an indication of the program state of computer 3 which, in turn, is used to detect when a sequence of consecutive signals appears to represent a SIT tone sequence. Flag LOCK is the flag referred to during the discussion of the microprocessor 5 program. Two storage locations GAP1 and GAP2 are used to store counts which measure the time duration of the time gaps $t_{g1}$ and $t_{g2}$ between tone signals as shown in FIG. 2. Finally, SEGCNT1, SEGCNT2 and SEGCNT3, sometimes aggregately referred to as SEGCNT, are used to store loop counts through the program which, in turn, are used to measure the time duration of suspected SIT tone signals.

Figure 11:
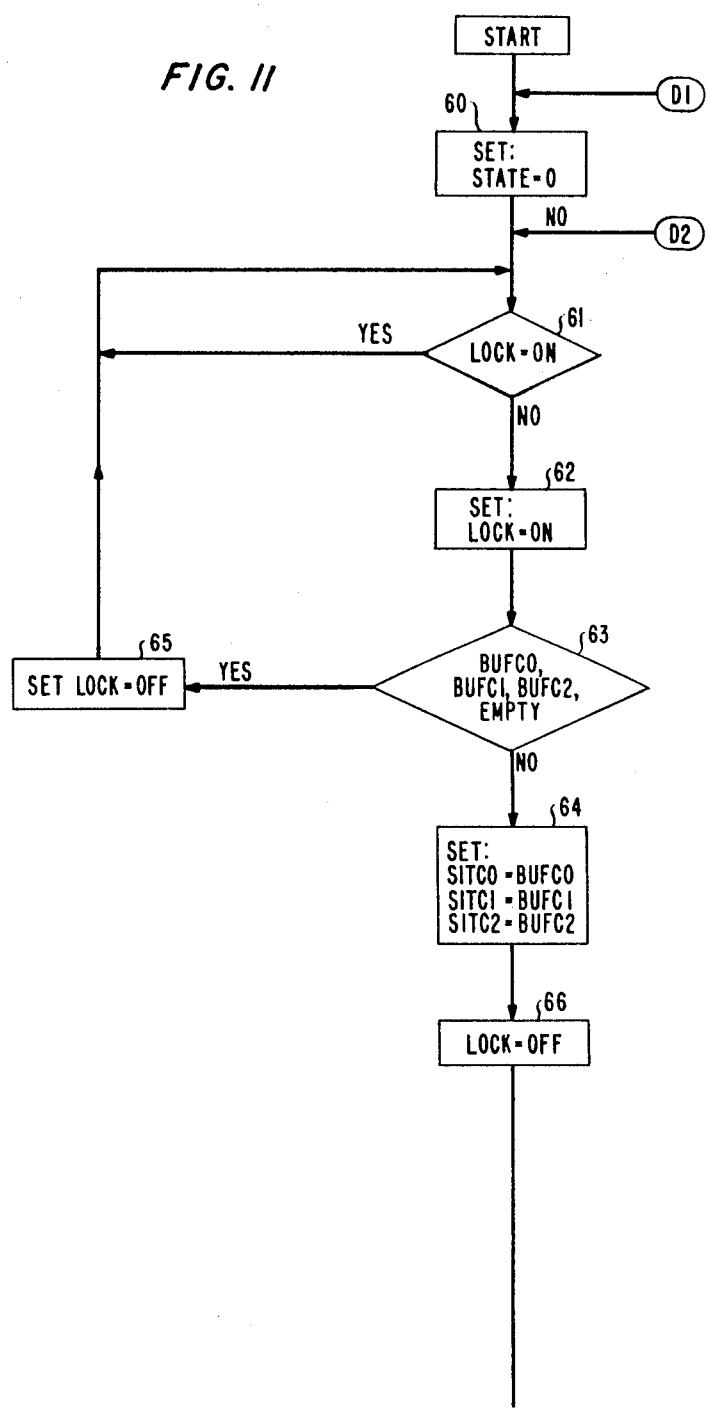
Figure 16:
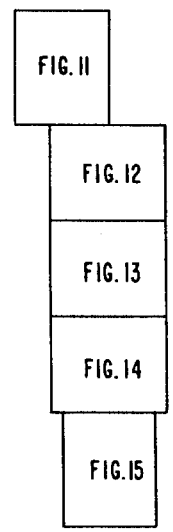

With reference now to FIG. 11, the program of computer 3 begins by setting STATE=0 at step 60. If LOCK is set to the ON state at step 61, the program loops at that point until the state is set to OFF by microprocessor 5 indicating that microprocessor 5 has loaded BUFC0, BUFC1 and BUFC2 with a set of coefficients. At this time, computer 3 sets LOCK to state ON at step 62 to prevent microprocessor 5 from modifying the contents of the BUF registers. At steps 63 and 64, the program transfers the contents of BUFC0, BUFC1 and BUFC2 to SITC0, SITC1 and SITC2, respectively, emptying the BUF registers. If the BUF registers are already empty as when tested at step 63, the program returns LOCK to the OFF state and waits for microprocessor 5 to load the BUF registers.

Figure 14:
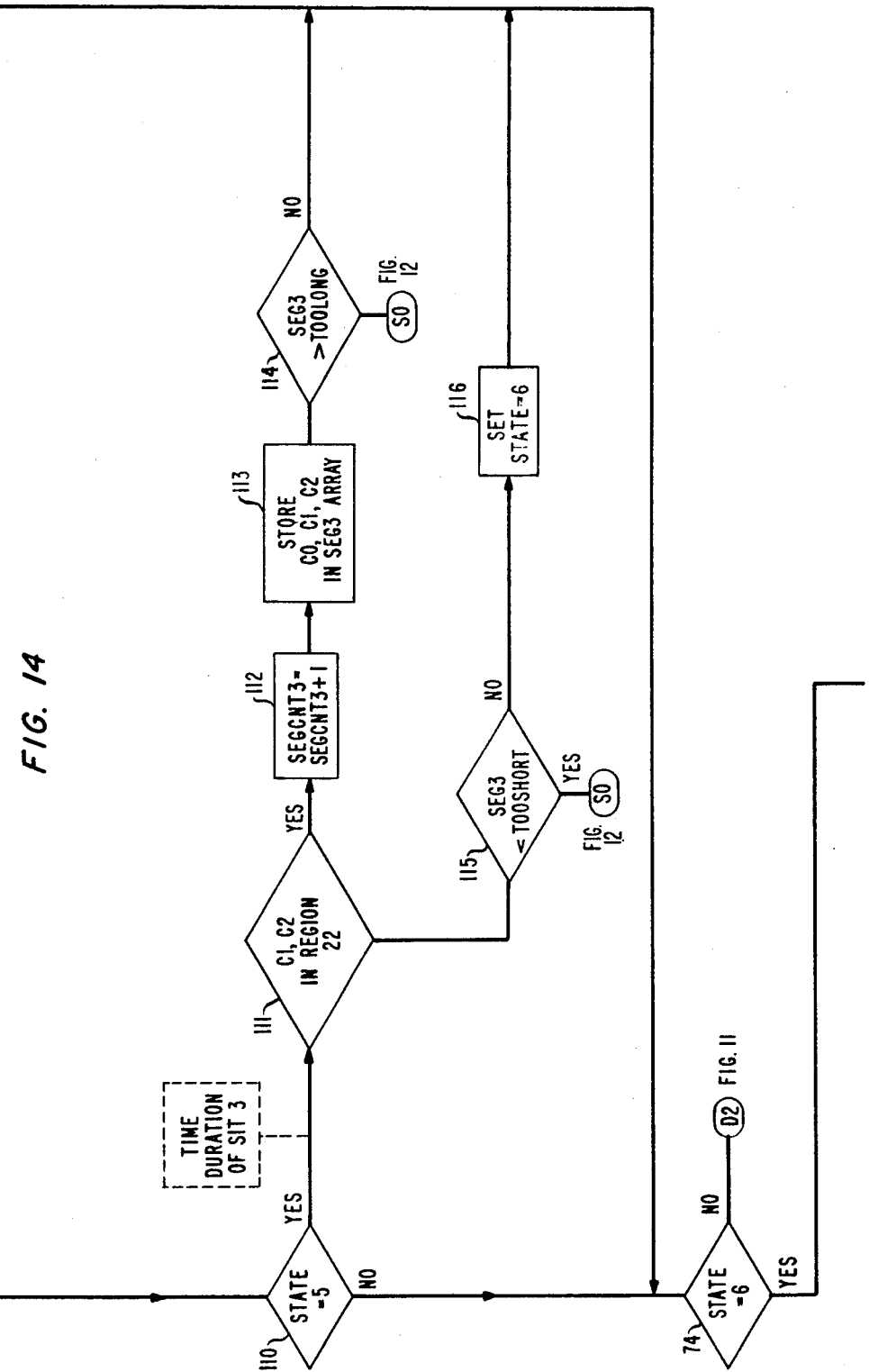

At step 66 the program sets LOCK to the OFF state to allow microprocessor 5 to load new coefficients into the BUF registers and it then proceeds to analyze the coefficients just collected. It does this by maintaining a state history of preceding coefficients. At step 67 the program is normally in state 0. In this state the program examines the C1 and C2 coefficients just stored in SITC1 and SITC2 to determine if they locate a point in region 20 of FIG. 5. It will be noticed that the coefficient C0 can be eliminated in making this determination since C0 gives only an indication of the energy level of the incoming signal and is therefore common to the denominator of both axes of the curve in FIG. 5. If C1 and C2 do not define a point in region 20, the program remains in state 0 because there is no present or prior indication of the beginning arrival of a suspected SIT tone sequence. If a point in region 20 is indicated, however, this may be the beginning of SIT tone 1 in FIG. 2. The program must analyze successive coefficients to determine if this is so. Preparatory to this, the program stores the C0, C1 and C2 coefficients from SITC0, SITC1 and SITC2 in the SEG0 array of FIG. 10 and sets the STATE indicator in FIG. 10 to state 1. These operations occur at steps 71 through 73. Thereafter the interrogation for state 6 at step 74 in FIG. 14 fails and the program returns to its beginning at step 61 to wait for the arrival of the next set of coefficients.

After the next set of coefficients arrive, the interrogation for state 1 at step 75 is affirmative and at step 76 the program begins to time the duration that successive sets of coefficients remain in region 20. As long as successive coefficients remain in region 20, the program remains in state 1 and SEGCNT1 is incremented by 1 at step 77 with each arrival of a set of coefficients. Each new set of coefficients will be stored in the SEG1 array at step 78. At step 80 a test is made to see if the time duration of the incoming signal being monitored has exceeded the maximum time duration $t_1$ of a valid SIT tone shown in FIG. 2. The program does this by multiplying the count in SEGCNT1 by 40 milliseconds, which is the arrival rate for each set of coefficients at computer 3. As long as the time duration has not exceeded its maximum, the program remains in state 1 and awaits the arrival of the next set of coefficients. Otherwise, the program updates STATE to state 0 at step 81 and reinitializes the GAP1, GAP2 and SEGCNT locations to 0.

Assuming that the program is in state 1, a set of coefficients will eventually be calculated which reside outside of region 20. At this time the program executes step 82 to determine if the time duration that the coefficients were in region 20 is too short to represent a valid SIT tone 1. If this is the case, the program again enters state 0 and begins looking for the next probable beginning of a SIT tone sequence. Otherwise, a probable SIT tone 1 signal has been identified and the program begins to time the gap $t_{g1}$ between probable SIT tone 1 and the arrival of SIT tone 2. It initiates this by setting the GAP1 counter to 0 and updating the state counter to state 2.

While the program is in state 2, identified at step 85, and as long as each successive set of coefficients does not enter the region 21 pertaining to SIT tone 2, the program continues to increment GAP1 at step 87 with the calculation of each succeeding set of coefficients and to test at step 88 whether $t_{g1}$ becomes excessive. If $t_{g1}$ becomes too long, the program returns to state 0. Otherwise it remains in state 2 until $t_{g1}$ is exceeded or a succeeding set of coefficients enters region 21. In the latter case, the program stores the new set of coefficients that are in region 21 in the SEG1 array at steps 90 and 91 and enters state 3, identified at step 94, where it times the duration of signals remaining in region 21. This timing is done at steps 95 through 98. Each region 21 set of coefficients are stored in the SEG2 array until either the duration becomes too long as determined at step 98 or a set of coefficients falls outside region 21 causing the execution of step 100. If the duration of the probable SIT tone 2 is determined to be too short at step 100, the program again enters state 0. Otherwise it initiates the timing of the interval $t_{g2}$ shown in FIG. 2 by zeroing the GAP2 count at step 101 and entering state 4 at step 102. In state 4, identified at step 103, the program times the duration of $t_{g2}$ as long as no set of coefficients enters the coefficient region 22 pertaining to the third, or reference, SIT tone. If $t_{g2}$ becomes too long, the program enters state 0. The timing of $t_{g2}$ is accomplished at steps 104, 105 and 106. Either $t_{g2}$ eventually becomes too long or a set of coefficients eventually enters region 22. In the latter case, the program stores this coefficient set in the SEG3 array at steps 107 and 108 and enters state 5 at step 109.

State 5, identified at step 110, times the duration of the probable SIT tone 3 at steps 111 through 114 in the same fashion as the prior SIT tones were timed using SEGCNT3 to store the number of coefficient sets in region 22 that are received. The SEG2 array is used to store each set of coefficients. If the probable SIT tone 3 becomes too long to represent a valid third SIT tone, step 114 returns the program state to 0. When a succeeding set of coefficients does not reside in region 22, step 115 determines from SEGCNT3 if the probable signal was too short to be a valid third SIT tone. If so, step 115 returns the state to 0. Otherwise the state is updated to state 6 at step 116.

At this point, the program has identified the arrival of what appears to be a valid SIT tone sequence. However, this determination was made as was seen on the basis of an error margin chosen to compensate for the fact that error in frequency generation of the signals may have been present. The program now proceeds to refine its frequency and time measurements of the monitored signals, thereby enabling it to make a more refined test of the probable validity of the tone sequence. Since the program is now in state 6, the interrogation at step 74 is affirmative causing the program to execute step 120. In this step, the program computes an average value for each of the C0, C1, and C2 coefficients from the data stored in the SEG1, SEG2 and SEG3 arrays. Next, at step 121, the program computes the duration of each of the SIT tones by multiplying the number of sets of coefficients that were received pertaining to each of the SIT tones by 40 milliseconds, which is the arrival rate of each set of coefficients. At step 122, the program computes estimated values of the actual received frequencies of the tone pulses by projecting the average coefficient point in each of the regions 20, 21 and 22 on to the parabolic curve of FIG. 5 according to one of the two methods discussed previously, or by any other desired method. These estimated frequencies are identified at step 122 as LOWFREQ for SIT tone 1, MEDFREQ for SIT tone 2 and HIFREQ for SIT tone 3. At step 123, a correction factor identified as CALIB is computed illustratively by dividing HIFREQ by the defined value of the reference frequency REFREQ, here 1777 hz. The estimated measured frequencies LOWFREQ and MEDFREQ are corrected at step 124 by dividing those values by the correction factor CALIB. In addition, the measured time durations $t_1$ and $t_2$ of SIT tones 1 and 2 are corrected by multiplying those values by the correction factor.

The above completes the reception and correction operations on the probable SIT tones. At step 125 the program uses the corrected frequency and time duration values to identify and classify the sequence as an actual SIT tone sequence and further to classify the type of announcement by referring to a table such as that illustrated in FIG. 3. The SIT type is classified at step 126 and the SIT type occurrence and type is reported to the central processor 1 of FIG. 1 at step 127. The program then begins operations to detect and classify the next occurring SIT tone sequence at step 60.

It is to be understood that the above-described arrangement is illustrative of the application of the principles of the invention and that other arrangements may be devised by those skilled in the art without departing from the spirit and scope of the invention.

What is claimed is:

1. A method of signaling by transmitting to a receiver one or more frequency encoded information signals, characterized by transmitting a reference signal having a defined frequency in conjuncton with the information signals, measuring the frequency of each of the reference and information signals at the receiver, determining the difference between the defined frequency of the reference signal and the actual frequency of the received reference signal, and adjusting the measured value of the frequency of each of the information signals in accordance with the difference between the defined frequency of the reference signal and the actual frequency of the received reference signal.

2. A method of automatically detecting prescribed types of telephone transmittals, characterized by transmitting a sequence of predetermined characterizing signals in conjunction with an associated telephone transmittal in which one of the signals is a reference signal defined by at least one signal parameter having a defined reference value, automatically monitoring telephone connections to detect signals appearing to represent said predetermined sequence of signals, calculating a correction factor according to the error between the defined reference value of the reference parameter and the measured value of the corresponding parameter of a suspected reference signal in a signal sequence detected by the immediately preceding step, correcting the remaining signals of the detected sequence according to the correction factor, and testing the corrected signals to determine if a prescribed type of telephone transmittal was detected.

3. A method of automatically detecting recorded announcements in a telephone service evaluation system, characterized by transmitting a prescribed sequence of predetermined tone signals in conjunction with each recorded announcement in which one of the tone signals is a reference tone signal having a defined reference frequency, monitoring telephone connections to detect a signal sequence appearing to be, within a determined error for each tone signal, said prescribed tone sequence, calculating a correction factor according to the error between the defined reference frequency and the measured frequency of the suspected reference signal of the monitored sequence, correcting the measured frequencies of the remaining signals of the monitored sequence in accordance with the correction factor, and testing the corrected tone signals to detect the presence or absence of a recorded announcement.

4. A method of automatically detecting and classifying recorded announcements in a telephone service evaluation system, characterized by recording on a rotating magnetic announcement machine in conjunction with a recorded announcement a sequence of tone signals whose frequency and duration at a prescribed specification speed of the announcement machine uniquely classify the type of announcement and in which one of the tone signals is a reference tone signal having a defined reference frequency at the prescribed specification speed, automatically monitoring telephone connections for a sequence of tones whose frequency and duration appear within determined error margins to represent said sequence of classifying tone signals, calculating a correction factor in accordance with the error between the defined reference frequency and the measured frequency of the suspected reference signal, correcting the measured frequencies and time durations of the remaining monitored tone signals in accordance with the correction factor, and using the corrected frequencies and time durations to classify the associated announcement or to reject the sequence as identifying a recorded announcement.

5. The invention of claim 4 in which the tone signals other than the reference tone signal are encoded by frequency within prescribed frequency bands and further encoded by duration within a prescribed interval at the specificaton speed of the announcement machine, and the encoded frequency bands and duration intervals are further partitioned into sub-bands and subintervals to encode the types of annoucements, and the monitoring step is characterized by repetitively sampling the analog state of a monitored telephone connection at a prescribed rate, defining regions determined by the autocorrelation coefficients representative of each of the bands of the signal tones with an appropriate error margin, periodically calculating at least the first three autocorrelation coefficients from the samples, determining if the autocorrelation coefficients fall within the define regions, and determining from the autocorrelation coefficients and their duration if a classifying sequence of tone signals has occurred.

6. The invention of claim 5 wherein the regions are defined by areas on and interval to the curve described by the equation $C2/C0 = 2(C1/C0)^2 - 1$ and encompassing the prescribed frequency bands of the tone signals where $C1/C0$ and $C2/C0$ are orthogonal axes of the curve and $C0$, $C1$ and $C2$ are the first three autocorrelation coefficients of a telephone connection signal.

7. The invention of claim 6 wherein the step of determining if a probable classifying sequence of tone signals has occurred is characterized by examining successive sets of autocorrelation coefficients to detect a sequence of points lying within a first prescribed one of the regions, followed by a sequence of coefficients lying within a second prescribed one of the regions, followed by a sequence of coefficients lying within a third prescribed one of the regions and to measure the time interval that the coefficients in each region persist.

8. The invention of claim 7 wherein the step of determining if a probable classifying sequence of tone signals has occurred is further characterized by verifying from the successive sets of autocorrelation coefficients that excessive time gaps do not separate the coefficients in the first and second regions and the coefficients in the second and third regions.

9. The invention of claim 7 wherein the step of determining if a probable classifying sequence of tone signals has occurred is further characterized by calculating average values of $C0$, $C1$ and $C2$ from the successive sets of coefficients for each of the first through third regions, and projecting a point described by the average values of $C0$, $C1$ and $C2$ within each region onto the curve $C2/C0 = 2(C1/C0)^2 - 1$ to estimate the fundamental frequency of the signal corresponding to each of the regions.

10. The invention of claim 9 wherein the projecting step is further characterized by projecting the averaged point within each region onto the curve along a line perpendicular to the curve and extending through the point.

11. The invention of claim 9 wherein the projecting step is further characterized by projecting the averaged point in each region onto the curve along a line extending through the point described by the intersection of the axes $C2/C0$ and $C1/C0$.

12. The invention of claim 9 wherein the step of determining if a classifying sequence of tone signals has occurred is further characterized by converting the projected points on the curve to their corresponding fundamental frequencies.

13. The invention of claim 12 wherein the correction factor calculating step is further characterized by dividing the converted frequency corresponding to the reference frequency tone signal by the defined value of the reference frequency.

14. The invention of claim 13 wherein the step of correcting the measured frequencies and time durations of the tone signals is further characterized by dividing the fundamental frequencies of the remaining tone signals by the correction factor.

15. The invention of claim 13 wherein the step of correcting the measured frequencies and time durations of the tone signals is further characterized by multiplying the measured time durations of the tone signals by the correction factor.

16. The invention of claim 14 or 15 wherein the step of determining if a classifying sequence of tones has occurred is further characterized by comparing the corrected frequencies of the tones and their respective corrected time durations to defined bands of frequencies and intervals of time duration to identify an associated type of announcement.

17. The invention of claim 16 further characterized by rejecting the tone sequence as a classifying tone sequence if any of the corrected tone frequencies fall outside the defined frequency band for that tone.

18. The invention of claim 17 further characterized by rejecting the tone sequence as a classifying tone sequence if any of the corrected time durations of the tones fall outside the defined time interval for that tone.

19. A tone signal receiver arranged to compensate dynamically for frequency error in the generation of sinusoidal signals comprising means (4,5) for measuring the frequencies of each of a plurality of incoming signals in which one of the signals is a reference signal having a defined frequency, means for calculating a correction factor based on the difference between the defined frequency of the reference signal and the actual frequency of the received reference signal, and means for adjusting the actual frequency of each of the remaining signals in accordance with said correction factor.

20. A system for automatically detecting and identifying certain types of message transmittals in a telephone network wherein each transmittal is accompanied by a sequence of special information tones comprising a reference tone signal having a defined reference frequency and a sequence of second tone signals each having a frequency in the range of one of a plurality of prescribed frequency bands to encode the transmittal type, characterized by data extractor means (4) including sampling means (12) for repetitively sampling the analog state of a telephone connection at a prescribed rate which is relatively fast in relation to the frequencies of the tone signals, means (5) responsive to the samples for periodically calculating at least the first three autocorrelation coefficients of the signals appearing on the connection, and data processing means (3) responsive to the autocorrelation coefficients for detecting a probable sequence of tone signals including the reference tone signal identifying a said type of message transmittal, for computing a correction factor according to the error between the actual frequency of the probable reference tone signal and the defined frequency of a reference tone signal, for adjusting the measured frequencies of the second tone signals according to the correction factor, and for reevaluating the adjusted tone signals as a probable sequence identifying one of the said types of message transmittals.

21. The invention of claim 20 wherein said sampling means comprises digital sampling means.

22. The invention of claim 21 wherein the digital sampling means comprises analog sampling means and an analog to digital converter for converting the analog samples to digital samples.

23. The invention of claim 20 wherein the autocorrelation coefficient calculating means comprises a microprocessor.

24. The invention of claim 23 wherein the microprocessor comprises program means for accumulating incremental autocorrelation coefficient values from each of a prescribed number of the samples and for repetitively transmitting final accumulated coefficients to the data processing means after each group of the prescribed number of samples.

Figure 12:
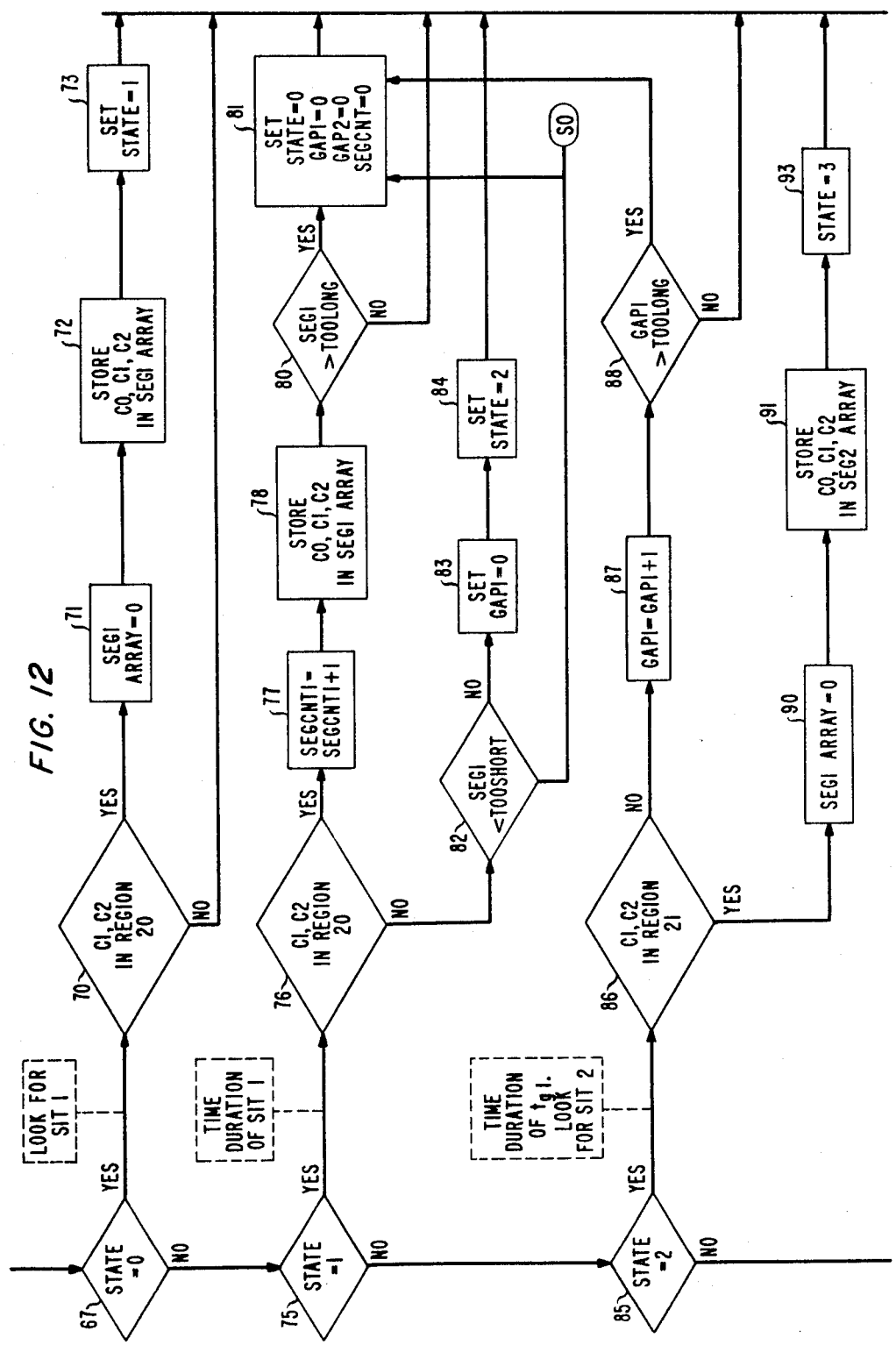
Figure 13:
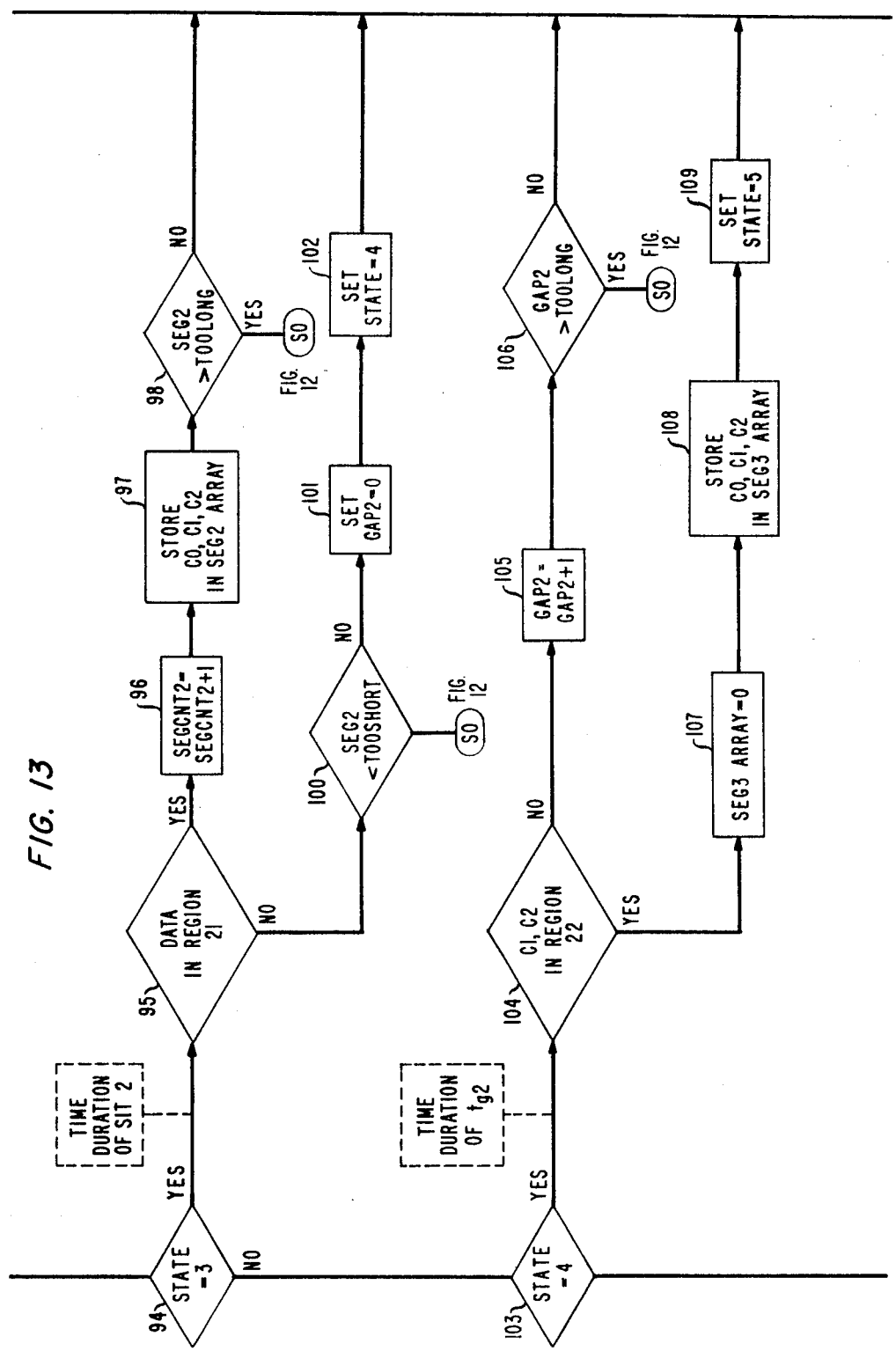

25. The invention of claim 20 wherein the data processing means is further characterized by program state means (FIGS. 11, 12, 13) for successively detecting consecutive sets of autocorrelation coefficients that appear within a prescribed margin of error to correspond to the arrival of a sequence of the special information tones.

26. The invention of claim 25 wherein the margins of error for each special information tone is prescribed by a region of autocorrelation coefficients encompassing at least the frequency band of the tone plus a defined amount of random noise.

27. The invention of claim 26 wherein the data processing means is further characterized by first storage means (SEG1, SEG2, SEG3) for storing all autocorrelation coefficients pertaining to each of the special information tone signals, and wherein the data processing means is further characterized by program means (120) activated by the program state means for calculating an average value of each autocorrelation coefficient for each of the special information tone signals using the coefficients stored in the first storage means, program means (122) for converting the averaged coefficient values into a fundamental frequency for each of the tone signals, program means (123) for calculating the correction factor by dividing the fundamental frequency for the reference tone signal by the defined frequency of the reference tone signal, program means (124) for dividing the fundamental frequencies of the remaining tone signals by the correction factor to calculate corrected frequencies for the tone signals.

28. The invention of claim 27 wherein the data processing means is further characterized by second storage means (SEGCNT1, SEGCNT2, SEGCNT3) for storing a representation of the time duration of each tone signal, and program means (124) for multiplying the time duration of each tone signal by the correction factor to obtain corrected values of the time duration of each tone signal.

29. The invention of claim 25 wherein the data processing means is further characterized by program means (FIG. 15: 120-123) activated by the program state means to calculate the correction factor.

* * * * *